United States Patent
Okazaki et al.

(10) Patent No.: US 6,578,067 B1
(45) Date of Patent: Jun. 10, 2003

(54) APPARATUS, SYSTEM, METHOD AND MEMORY MEDIUM FOR DATA PROCESSING

(75) Inventors: Hiroshi Okazaki, Yokohama (JP); Toshihiko Fukasawa, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/161,403

(22) Filed: Sep. 28, 1998

(30) Foreign Application Priority Data

Sep. 30, 1997 (JP) .............................. 9-267371

(51) Int. Cl.$^7$ .............................................. G06F 13/10
(52) U.S. Cl. .................. 709/203; 709/202; 348/211.99; 348/211.14
(58) Field of Search ................................ 709/203, 202, 709/206; 348/143, 211–212, 211.99, 211.14; 345/150–153; 396/429; 713/202

(56) References Cited

U.S. PATENT DOCUMENTS

| | | | |
|---|---|---|---|
| 5,808,670 A | * 9/1998 | Oyashiki et al. | 348/143 |
| 5,944,783 A | * 8/1999 | Nieten | 709/202 |
| 5,964,832 A | * 10/1999 | Kisor | 709/202 |
| 6,012,083 A | * 1/2000 | Savitzky | 709/202 |
| 6,098,093 A | * 8/2000 | Bayeh | 709/203 |
| 6,128,653 A | * 10/2000 | del Val | 709/219 |
| 6,208,379 B1 | * 3/2001 | Oya et al. | 348/213 |
| 6,209,048 B1 | * 3/2001 | Wolff | 710/62 |
| 6,380,972 B1 | * 4/2002 | Suga et al. | 348/211.99 |

OTHER PUBLICATIONS

Robb Linsky, How the Internet Works, 1997, Ziff–Davis Press, Special Edition, pp. 208–217, 229–231, 234–235.*
Axis Neteye 200 User's Manual, Axis Communications, pp. 1–90.*
Axis Neteye 200, Network Snapshot Camera for Internet/Intranet, Axis Communications, pp. 1–5.*

* cited by examiner

*Primary Examiner*—Greta Robinson
*Assistant Examiner*—Debbie M. Le
(74) *Attorney, Agent, or Firm*—Fitzpatrick, Cella, Harper & Scinto

(57) ABSTRACT

In response to a request transmitted by a client through the Fire Wall, a unique service server provides a unique service to the client by using a communication port. Response to an HTTP request which is not directed to the unique service, the unique service server transfers the request to the WWW server without processing, it provides both services by one communication port. A request for acquiring a data service is sent by a client HTTP through the Fire Wall, the unique service server determines the client's request is directed to data provided by the WWW server or directed to the uniquely provided data. If the unique service server determines that the client request is directed to the uniquely provided data, the processing is executed. If the unique service server determines that the client request is directed to data provided by the generally used WWW server, the server transfers the request to the WWW server.

16 Claims, 10 Drawing Sheets

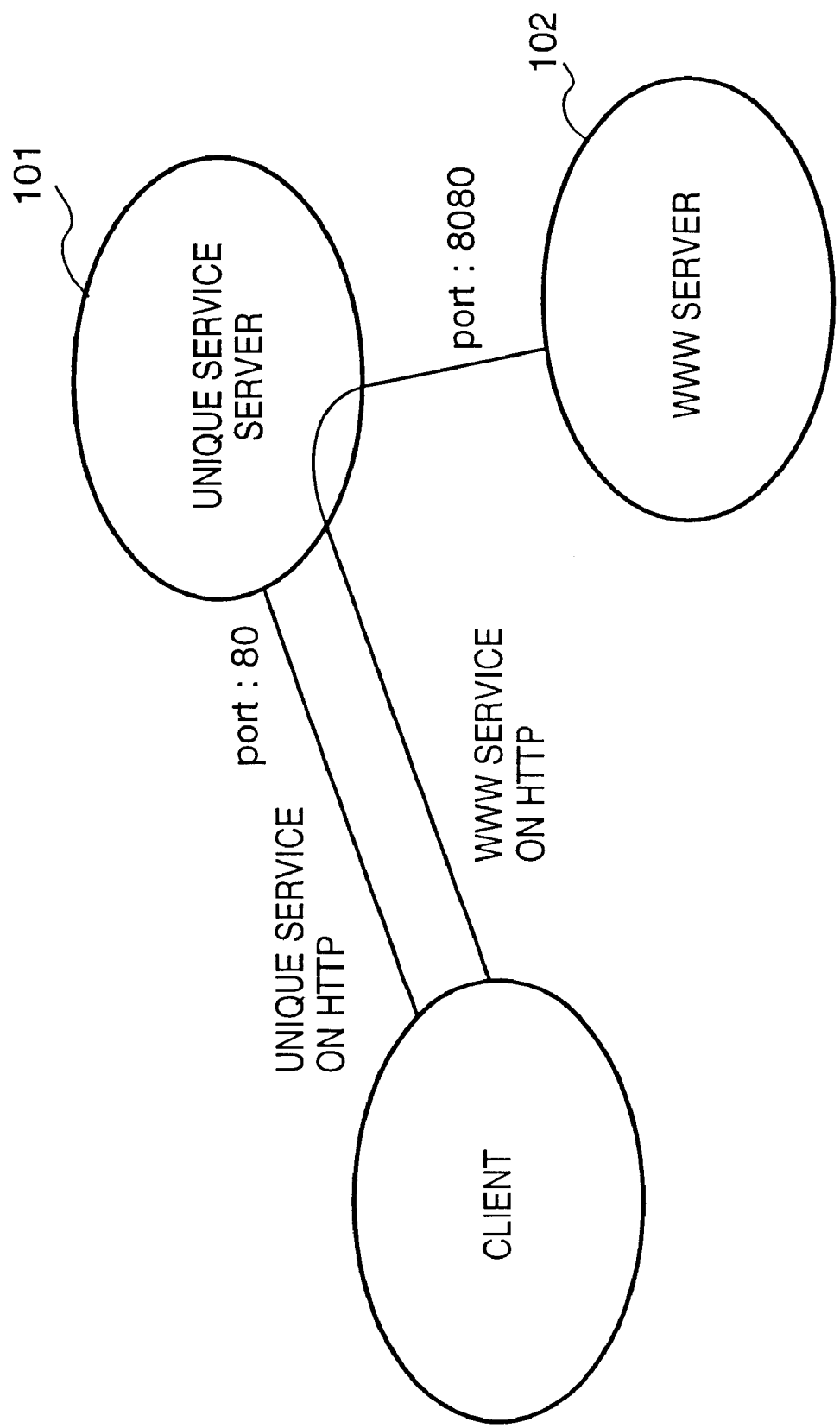

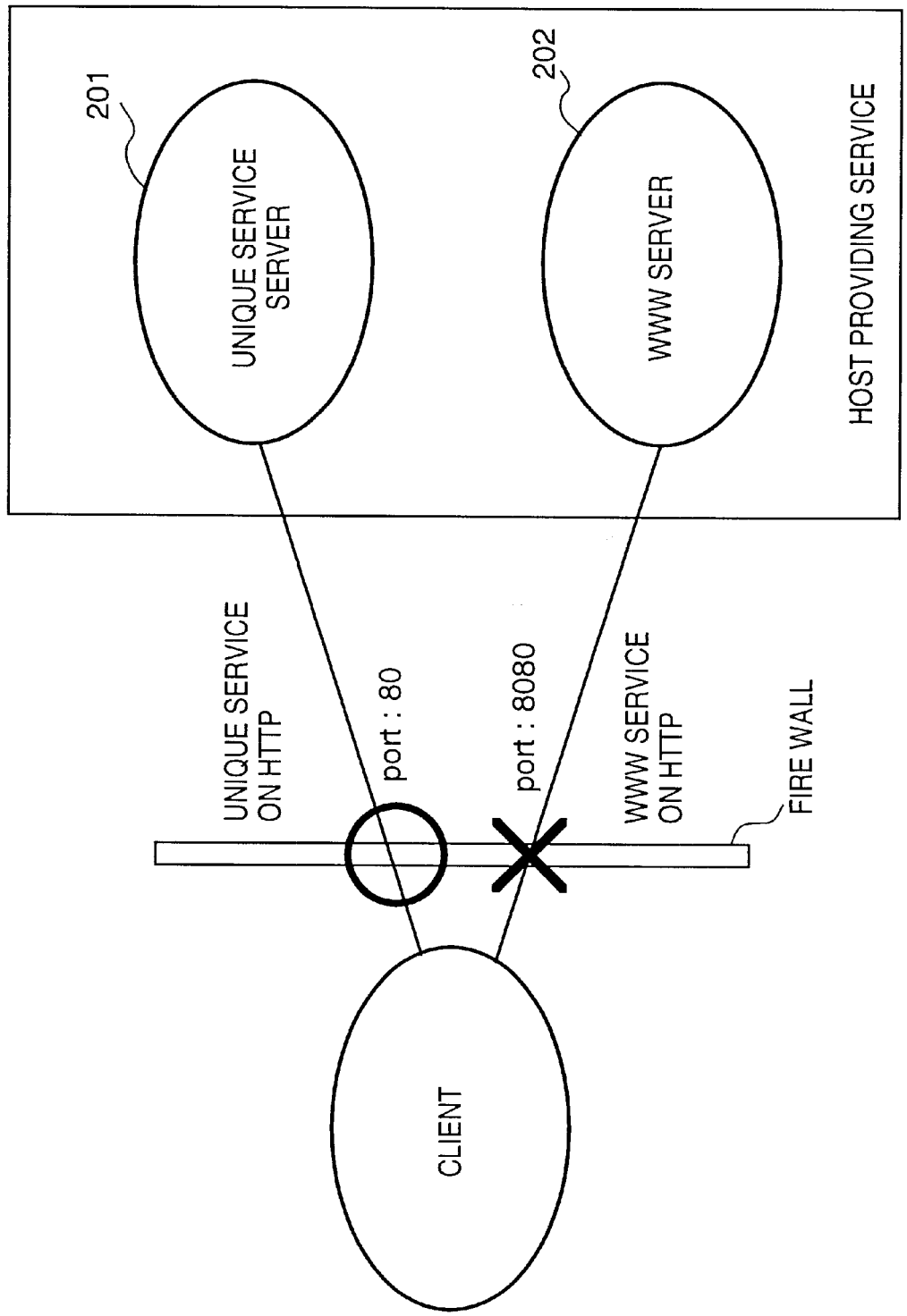

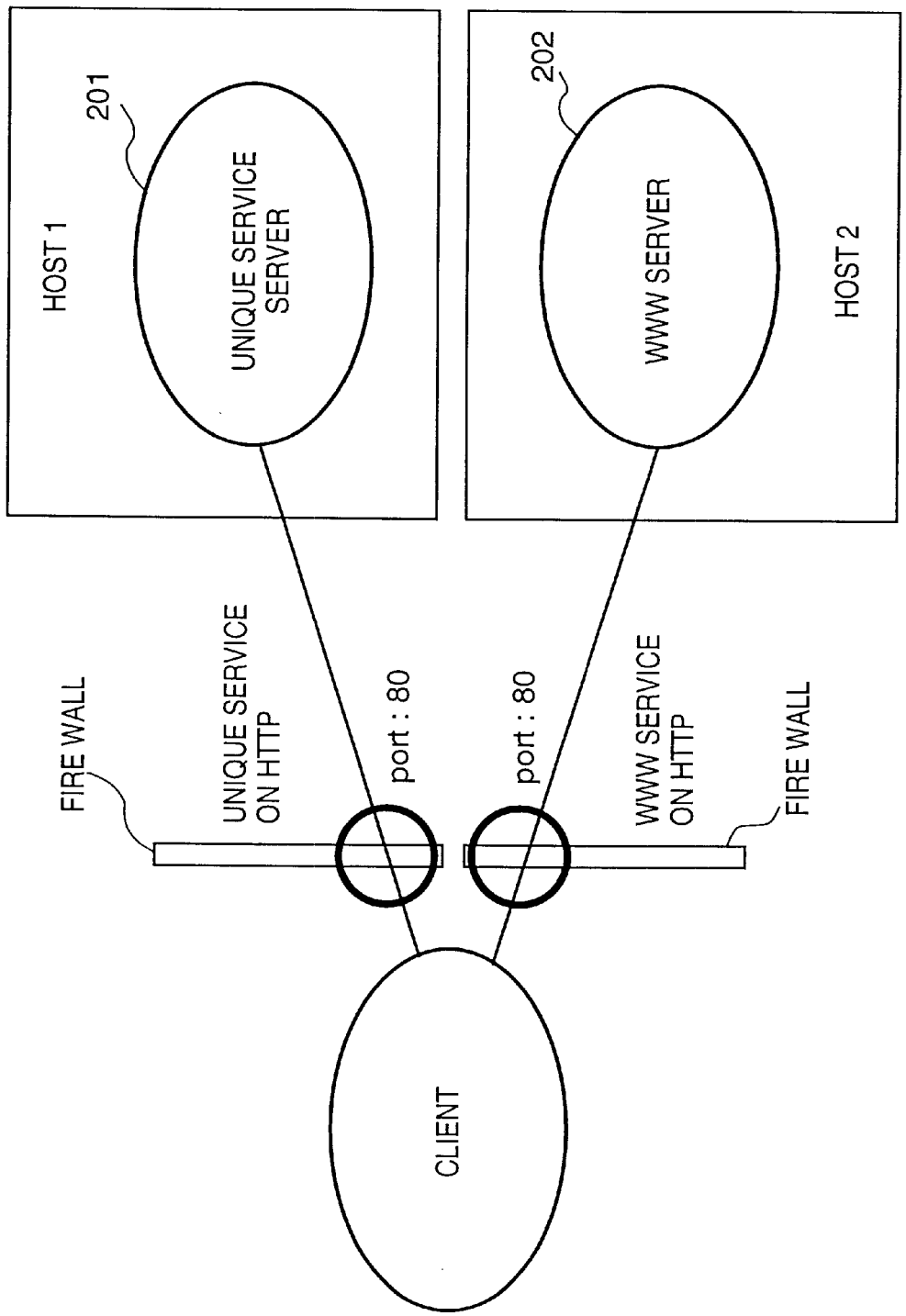

401 : COMMAND TABLE

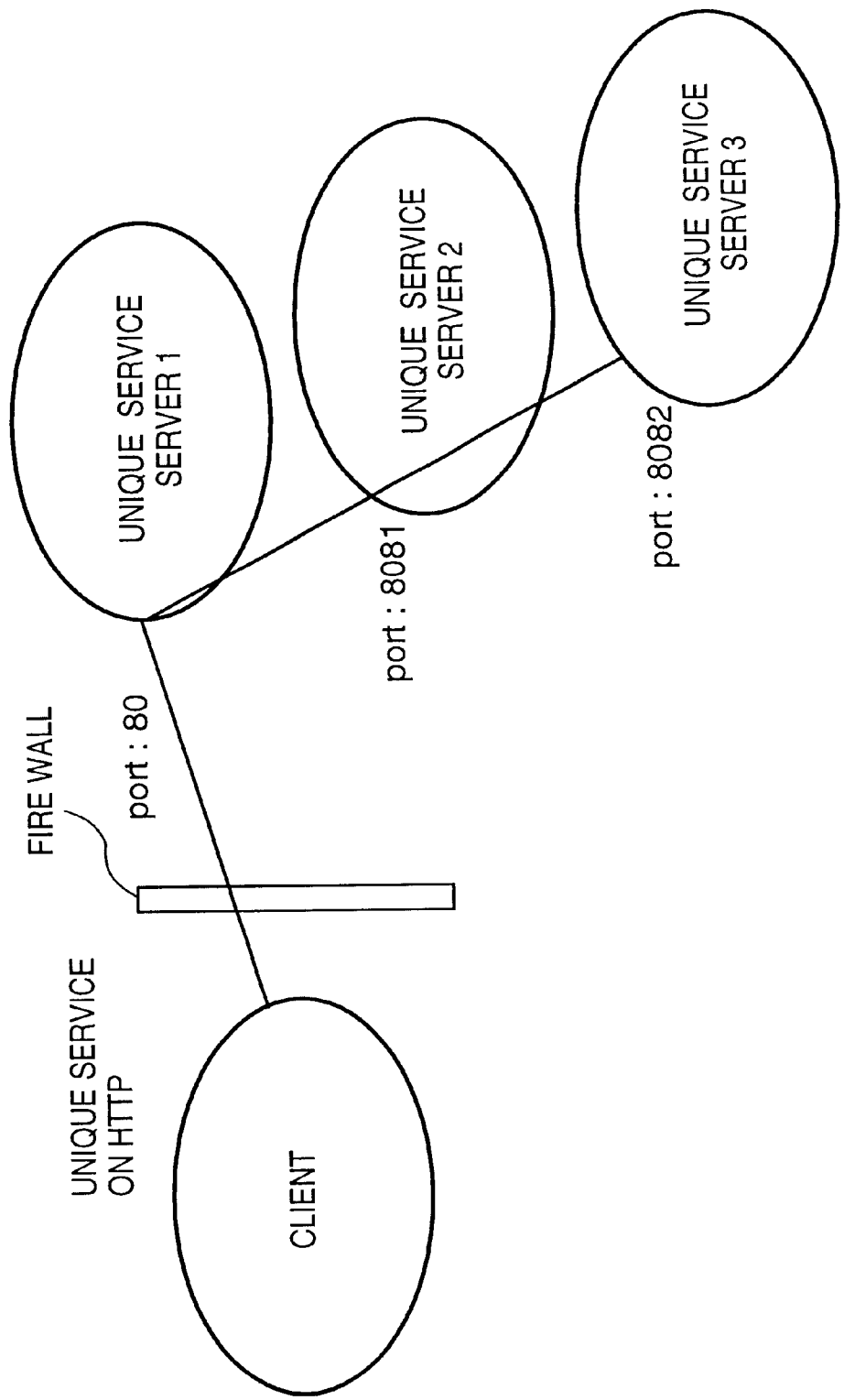

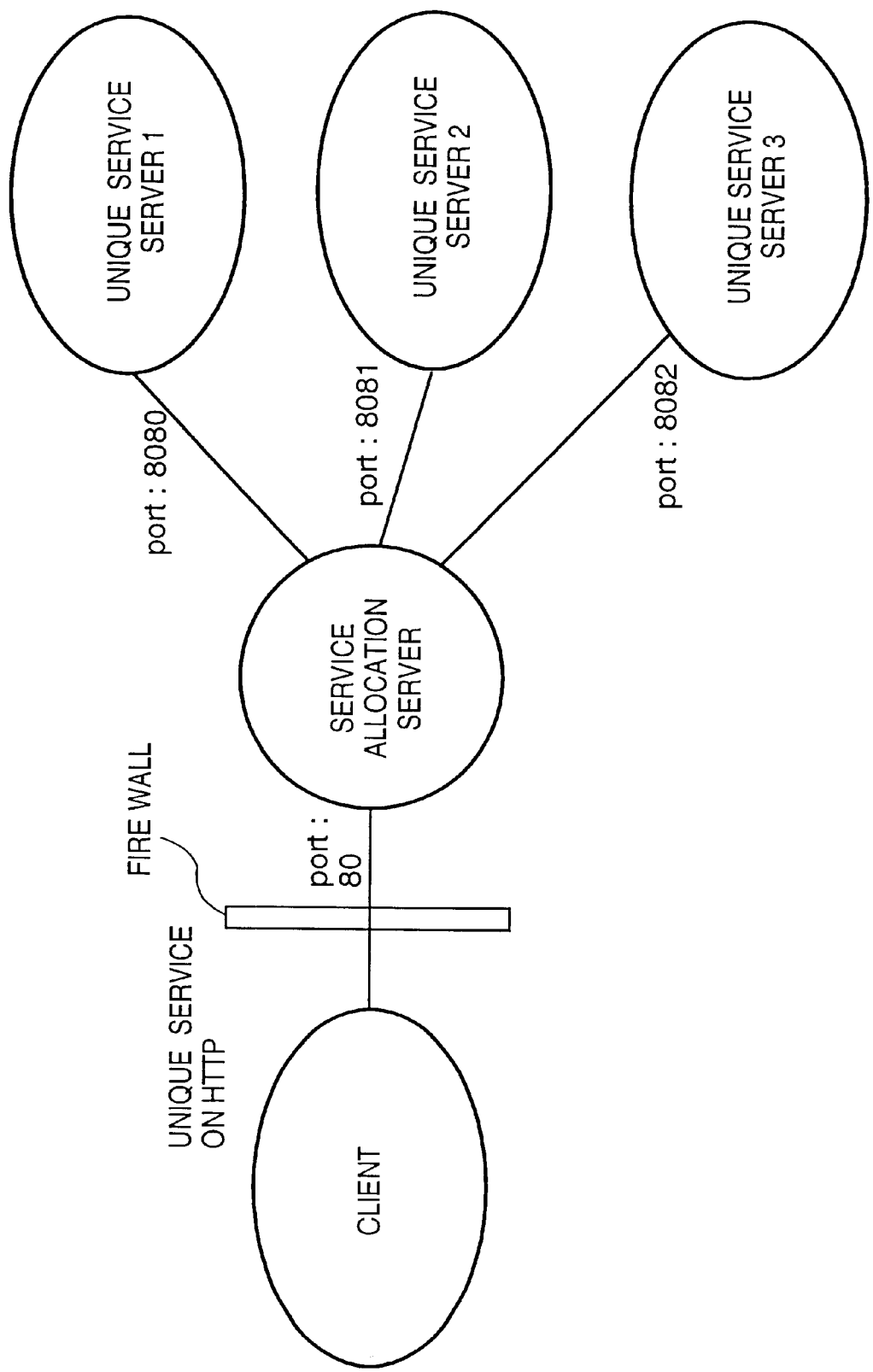

FIG. 8

| COMMAND A | SERVER 1 |
|---|---|
| COMMAND B | SERVER 2 |
| COMMAND C | SERVER 1 |
| COMMAND D | SERVER 3 |
| ⋮ | ⋮ |
|  |  |
|  |  |
|  |  |
|  |  |

APPARATUS, SYSTEM, METHOD AND MEMORY MEDIUM FOR DATA PROCESSING

BACKGROUND OF THE INVENTION

The present invention relates to a data processing apparatus, data processing system, a method of data processing and a storage medium. More particularly, the present invention relates to an apparatus, system, method and storage medium for providing data in conformity with Hyper Text Transfer Protocol (HTTP).

When providing a user with a live image service, which is not provided by the existing generally used World Wide Web (WWW) server, in conformity with Hyper Text Transfer Protocol (HTTP) used in the Internet, it is necessary to generate a new independent program module. When providing a unique extension service and the WWW service, both the generated program module and the WWW server must be utilized.

When the WWW server and unique service server are simultaneously started to provide both services on HTTP, a problem may occur when the services pass a Fire Wall. Since two servers are separate execution modules, when the two servers are operated on a single machine, separate communication ports must be used.

If the Fire Wall is set such that a service can pass only the port number 80, i.e., a default port of HTTP, one of the services cannot pass the Fire Wall to be supplied to a client (a terminal receiving the service).

Under this circumstance, in order to enable both services to pass the Fire Wall, two computers must be provided for respective services, or the WWW server function must be incorporated in the module of the unique service.

SUMMARY OF THE INVENTION

The present invention is made in consideration of the above situation, and has as its object to provide a data processing apparatus, data processing system, a method of data processing and a storage medium, which can supply a client with data in conformity with a generally used protocol even if the data is provided by a server or is unique data which is not provided by the server.

In order to achieve the above object, the data processing apparatus according to the present invention has the following configuration. More specifically, the data processing apparatus for supplying a client in a network with data other than data provided by a server in conformity with a generally used protocol, comprises: determining means for determining whether a given request is directed to data supplied by the server or directed to uniquely supplied data; and transferring means for transferring the request to the server in accordance with the determination result of the determining means.

According to an aspect of the present invention, when a request is transmitted by a client through a Fire Wall, a unique service is provided through a communication port of the unique service server, and when a request in conformity with Hyper Text Transfer Protocol, which is not directed to the unique service, is transmitted by the client, the request is transmitted through the unique service server and transferred to the WWW server. By this, it is possible to provide a data processing apparatus, system, method and storage medium for providing a client with two services by using only one communication port.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a conceptual view of a construction of an embodiment of the present invention;

FIG. 2 is an explanatory view showing an unfavorable state when a service complying with HTTP is provided through a Fire Wall;

FIGS. 3A and 3B are explanatory views showing examples of construction capable of serving as a generally used WWW server and a server supplying a unique service;

FIGS. 5A and 5B are conceptual views showing constructions of other embodiments of the present invention;

FIG. 8 is an allocation table according to another embodiment of the present invention.

DETAILED DESCRIPTION OF THE PREFERRED EMBODIMENTS

Figure 3B:
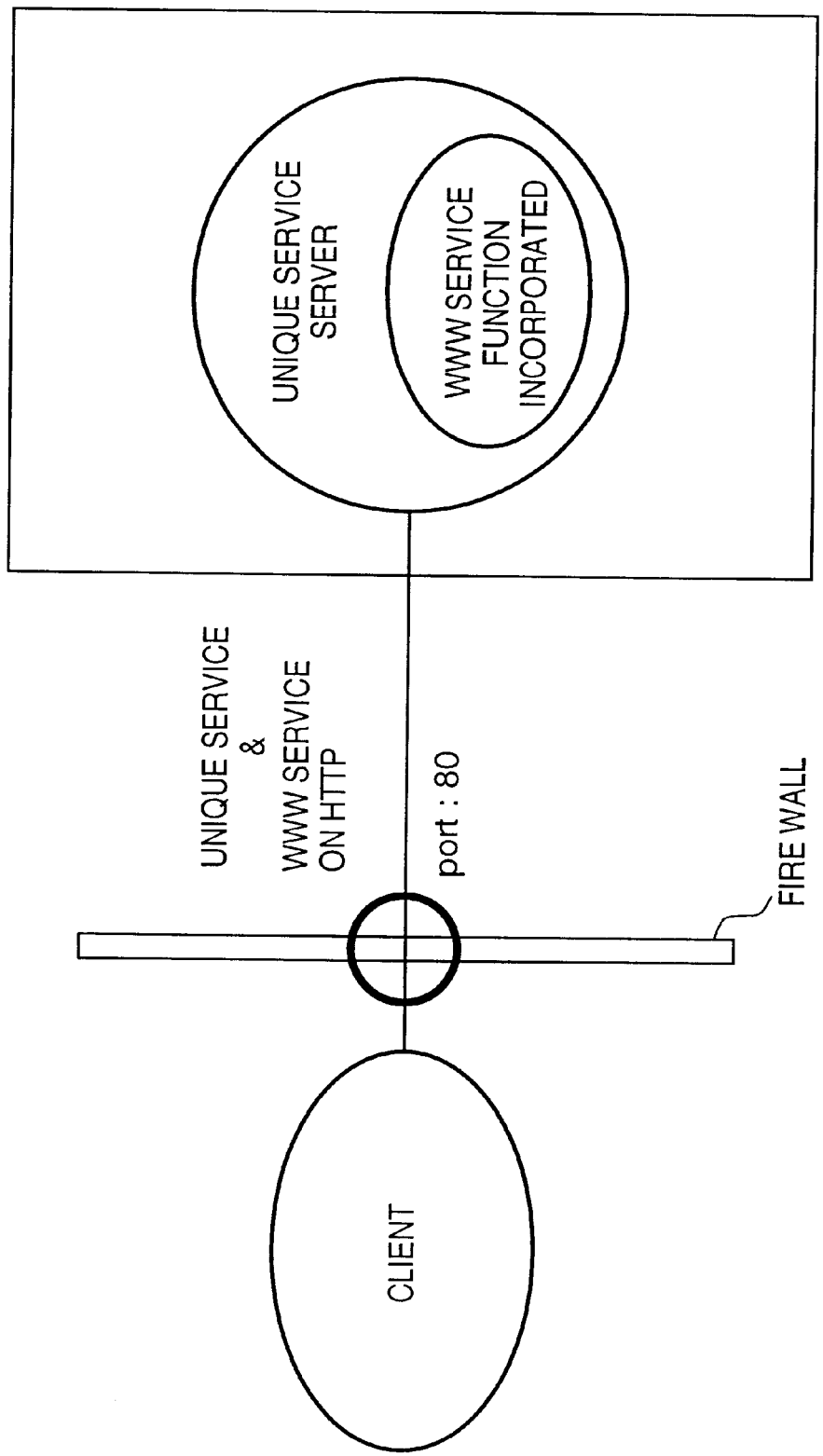

Preferred embodiments of the present invention will be described in detail in accordance with the accompanying drawings.

FIG. 1 shows an overall configuration of an embodiment of the present invention. Referring to FIG. 1, reference numeral 102 denotes the generally used World Wide Web (WWW) server, and 101 denotes a unique service server providing an original service which is not supplied by the WWW server 102.

A unique module operated on the unique service server 101 is a server module which transfers live images picked up by cameras proposed by the assignee of the present invention. In response to a request made by a Web browser operated on the client, the server module realizes the service for obtaining an image picked up by a camera and returning the image as a compressed image conforming to JPEG by utilizing the Hyper Text Transfer Protocol (HTTP). HTTP is employed so that the network user can request and utilize services through the Fire Wall. As an example of the unique service, a service for moving image or for audio data can be given in addition to still-image services; however, detailed description thereof will not be provided herein.

In the above configuration, in a case where a machine for supplying unique services provides a user with the generally used WWW service, a simple construction such as that shown in FIG. 2 may be provided. In this case, since the unique service module 201 serves as a different execution module from the WWW service module 202, different communication ports must be utilized. However, if the Fire Wall is set such that only a default port for the HTTP protocol is available, one of the services is unable to pass the Fire Wall.

In order to supply two services in the above state, two host units must be provided as the Fire Wall for each of the services as shown in FIG. 3A, or the WWW server function must be incorporated in the module of the unique service as shown in FIG. 3B. However, the former raises a problem of cost for setting up hardware or the like, and the latter raises a problem of high cost of development.

According to the present embodiment, as shown in FIG. 1, in a case the unique service server receives a request for a service other than the unique service, the unique service server mediates the communication between the client and a designated WWW server, thereby making it possible to support both services with one communication port.

Figure 4:
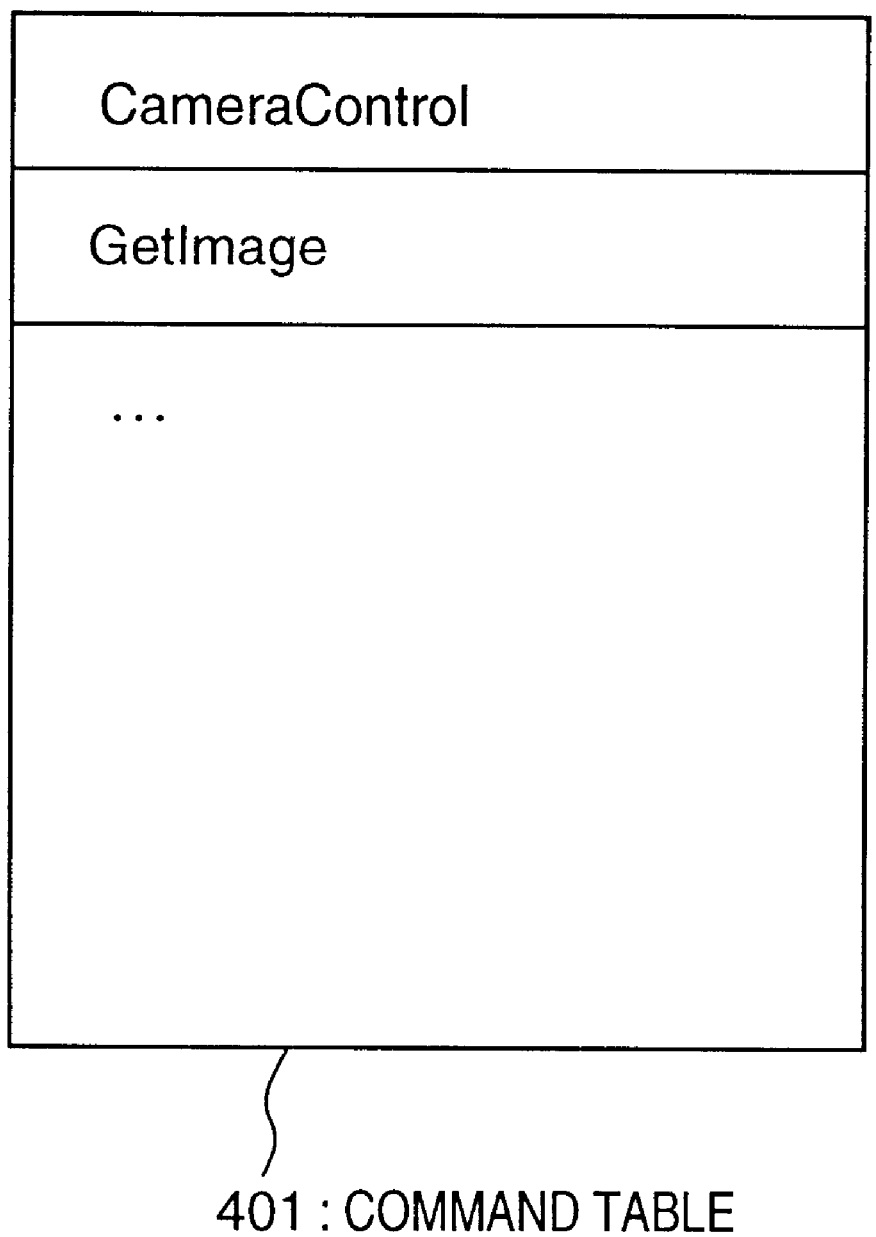
FIG. 4 is an explanatory view showing contents of a table according to the present embodiment.

The unique module includes a command table 401 shown in FIG. 4 (since the unique service server according to the present embodiment is a personal computer or the like, the table is stored in hard disc or RAM or the like). With respect to a command included in the table, the unique module performs processing therefor. With respect to a command which is not included in the table, the unique module transfers the command to the WWW server without further processing, and returns the response to the client without any processing.

Hereinafter, detailed description of data transmission will be provided. For instance, a request for camera control and a request for image acquisition as unique services are described as follows:

http://service_host/CameraControl?pan=10&tilt=5&zoom=30 http://service_host/GetImage The client transmits the above-described request to the port number 80 of the module of the unique service server 101.

The module of the unique service server 101 interprets this request, extracts an operator portion (in the above example, "CameraControl" or "GetImage"), and compares the operator with the contents of the table 401. Since the above operator "CameraControl" for controlling a camera or "GetImage" for acquisition of an image are included in the table 401, processing is performed by the module of the unique service server 101 and the result is returned to the client.

For instance, in a case where the operator (operation command) "CameraControl" is received, the camera is controlled in accordance with the subsequent data pan=10&tilt=5&zoom=30. As can be readily assumed, the camera is controlled such that the pan angle is 10° tilt angle is 5°, and zoom value (corresponding to zoom angle of view) is 30. Upon controlling the camera, a character string "OK" is returned. Meanwhile, in a case where the operator "GetImage" is received, an image is captured from the currently connected camera and returns the captured image as a compressed image conforming to JPEG. Note that since the assignee of the present invention has already proposed a number of techniques for controlling a camera and transferring an image picked up by the camera to a client, detailed description will not be provided herein.

A request to the WWW server 102, http://service_host/wwwroot/index.html is also received by the port number 80 of the module of the unique service server 101. Similar to the above, the operator portion "wwwroot" is extracted. Then, it is examined by referring to the table 401 that the operator "wwwroot" is not included in the table 401. In such case, assuming that the service port of the WWW server is 8080, the module of the unique service server 101 operates as if it is a client, and transmits the following request to the WWW server 102:

http://service_host:8080/wwwroot/index.html

When the WWW server returns the result in response to the above request, the module of the unique service server 101 transfers the result to the client without further processing, and the processing for this request ends.

Figure 6:
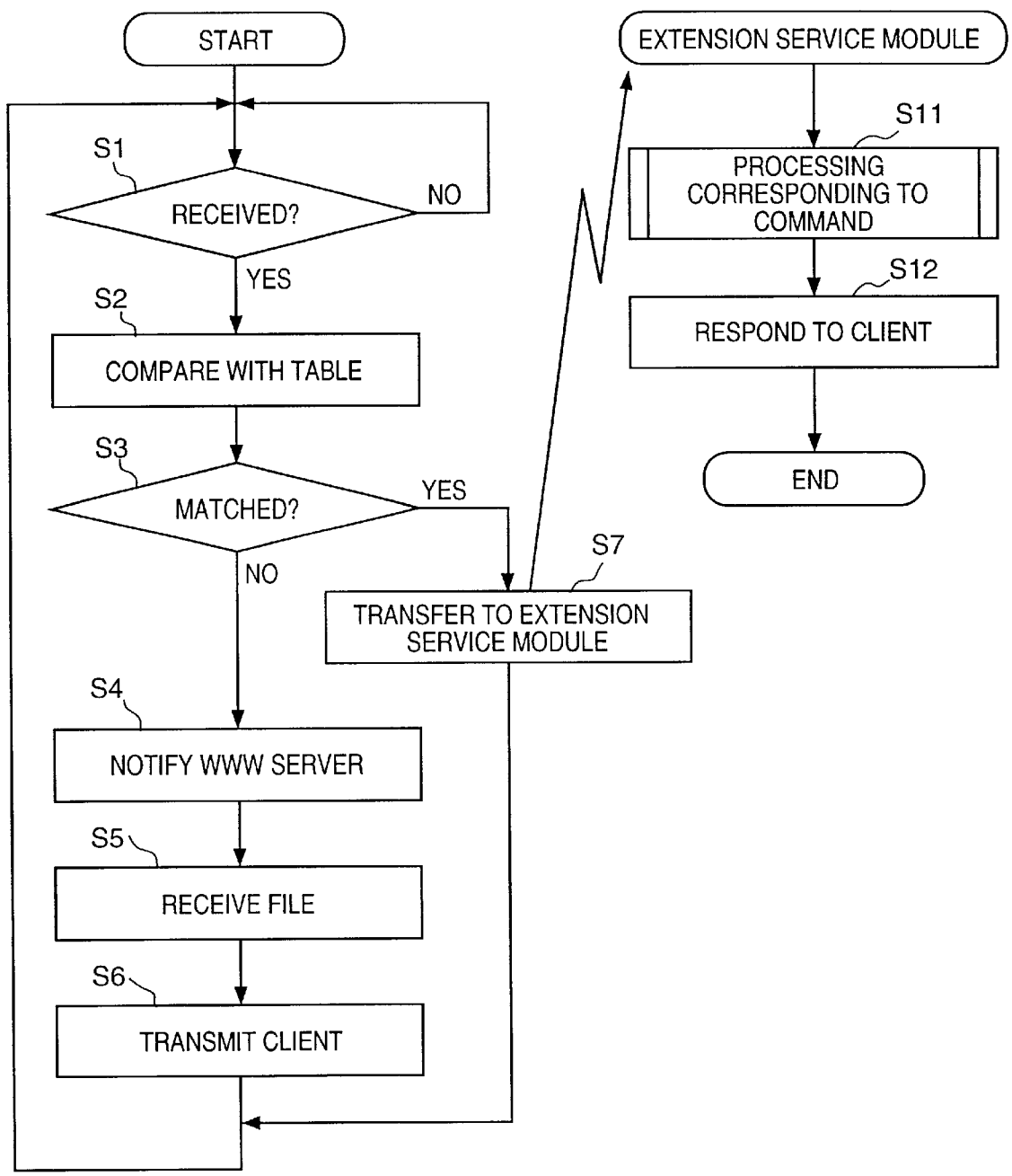
FIG. 6 is a flowchart showing operation processing performed by a unique service server of the present embodiment.

The unique service server 101 according to the present embodiment operates in accordance with the flowchart shown in FIG. 6. As shown in FIG. 6, there are two modules, one performing the processing of steps S1 to S7 and the other performing the processing of steps S11 and S12.

In step S1, when a client request in conformity with Hyper Text Transfer Protocol (hereinafter, referred to as HTTP request) is detected through the Fire Wall, the processing proceeds to step S2 where the unique service server 101 determines whether or not the request includes a request command related to the unique service by referring to the table 401. If the unique service server 101 determines that the request includes descriptions not in the table 401, i.e., descriptions directed to the WWW server, the processing proceeds from step S3 to S4 where the request is transferred to the WWW server in the manner described above (transferred to the WWW server as if the unique service server is the original requester). As a result, a file is transferred back from the WWW server in accordance with the HTTP. The unique service server 101 receives the file (step S5) and transmits the file to the client (step S6). Then, the processing returns to step S1.

While receiving a request from a client, if it is determined that the request includes a command uniquely used in the unique service server, the processing proceeds to step S7 where the command is used as an argument to execute an extension module which performs the unique processing. Then, the processing returns to step S1.

As shown in FIG. 6, the extension module interprets the received command and performs processing based on the command in step S11, e.g., changes a camera angle (pan angle, tilt angle and zoom value) or captures an image sensed by the camera. In step S12, the result is returned to the client. The contents of response vary depending on each command. For instance, in a case where a request to change the camera angle is executed, completion or reception of the request is notified to the client. In a case of "GetImage" command, processing is performed such that an image picked up by a camera is transferred to the client.

As described above, according to the present embodiment, in order to realize the unique extension service, the table 401 and extension service module are newly provided. However, since no change is necessary in the main module (steps S1 to S7 in FIG. 6), the unique extension service can be constructed by combining only necessary functions. Therefore, in a case where a new service is provided in the future, only a minimum modification is necessary; thus, developing a new service can be readily realized.

Note that the unique service server 101 according to the present embodiment can be realized by a generally used personal computer. Detailed construction thereof is shown in FIG. 7.

Figure 7:
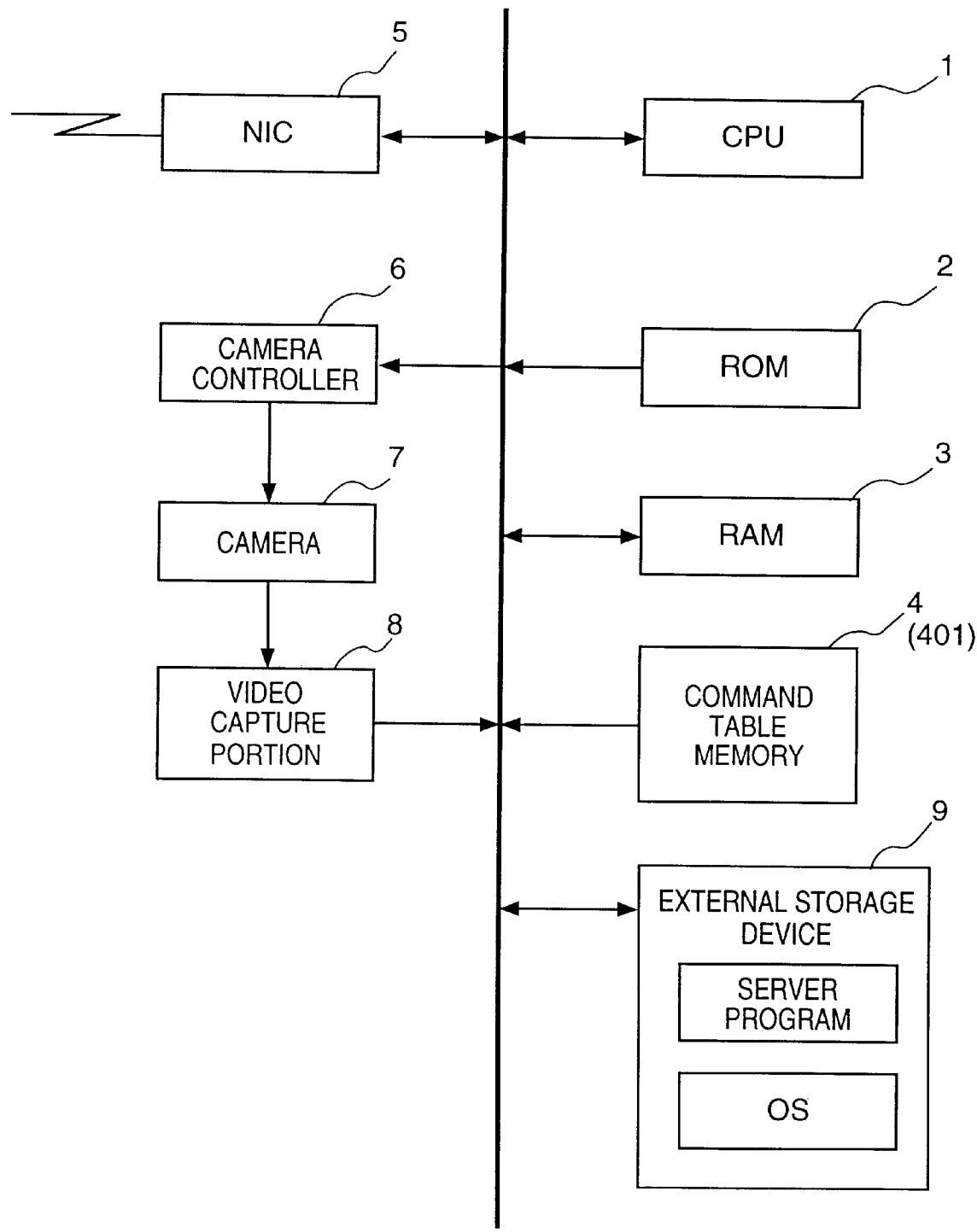
FIG. 7 is a block diagram of the unique service server according to the present embodiment.

In FIG. 7, reference numeral 1 denotes a CPU which controls the entire unique service server; and 2, a ROM where Basic Input/Output System (BIOS) or boot programs are stored. Reference numeral 3 denotes a RAM, to which OS (operating system) or server programs are loaded, and used as a work area of the CPU 1. Reference numeral 4 denotes a command table memory storing the command table 401 described above. Reference numeral 5 denotes a Network Interface Card (NIC) for communicating with a network. Reference numeral 6 denotes a camera controller which controls the camera angles (pan angle, tilt angle and zoom ratio) under the control of CPU 1. The camera 7 is attached to a pan head (not shown). By controlling the pan head by the camera controller 6, the pan and tilt angles are changed. By controlling the optical unit of the camera, the zoom ratio is changed. Reference numeral 8 denotes a video capture portion where image signals picked up by the camera 7 are received and captured as digital image data. Reference numeral 9 denotes an external storage device such as a hard disc or the like, where OS (Operating System) or programs serving as the unique service server as described above, are stored. When power to the personal computer is turned on, the OS is loaded into the RAM 3 in accordance with the boot program in the ROM 2, and the unique service server program is also loaded into the RAM 3, thereby serving as the above-described unique service server 101.

Other Embodiments

FIGS. 5A and 5B are structural views of a plurality of unique services provided.

As shown in FIG. 5A, by serially connecting the extension modules each adopting the similar processing scheme, an additional function can be independently provided in module units and a new service can be constructed by combining only the necessary functions. In this case, the above-described processing according to the flowchart shown in FIG. 6 is executed basically by each of the unique service servers.

FIG. 5B shows the case where the portion, having a table for allocation determination and receiving a service request from a client, is separated from the service servers. Modules providing respective extension services are arranged in parallel in the next level of the allocation module. In this case, it is possible to prevent efficiency from declining, caused due to the multi-level communications, unlike the case of FIG. 5A, and it is possible to construct the service by combining only the necessary functions.

The service allocation server has the same configuration as that shown in FIG. 7. However, in a case where the allocation server does not provide any services, the camera controller, camera and video capture are unnecessary. However, the allocation table shown in FIG. 8 is required. The allocation table shows correspondences between commands requested by clients and servers which accept the command.

Note that in the present embodiment, description has been provided based on an assumption that the unique service server is an apparatus including a controllable camera and having function to capture images sensed by the camera. However, a generally used apparatus, e.g., a personal computer, having hardware complying with the type of services, can realize the present invention. Therefore, the present invention can be realized by providing a storage medium, which stores program codes for realizing the above-described functions of the present embodiment, to a system or an apparatus, and reading the program codes with a computer (e.g., CPU, MPU) of the system or apparatus from the storage medium, then executing the program.

In this case, the program codes read from the storage medium realize the new functions according to the present invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according o the above embodiment are realized by executing the program codes which are read by a computer, the present invention includes a case where an OS (Operating System) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiment.

As has been set forth above, according to the present embodiment, in response to a client request received through the Fire Wall, the unique service is provided by using the communication port of the unique service server, and in response to a client request on HTTP which is not directed to the unique service, the request is transmitted through the communication port and transferred to the WWW server. In this manner, both services can be supplied to the client with only one communication port.

The generally used protocol of the present invention is not limited to HTTP protocol, but may be any protocol used on various network, such as Ethernet. Moreover, the present invention is applicable to other servers besides WWW server.

As set forth above, according to the present invention, it is possible to supply a client with data provided by the server or unique data provided by other server, in accordance with generally used protocol.

The present invention is not limited to the above embodiments and various changes and modifications can be made within the spirit and scope of the present invention. Therefore, to appraise the public of the scope of the present invention, the following claims are made.

What is claimed is:

1. A data processing apparatus for supplying a client in a network with data other than data provided by a server, in conformity with a generally used protocol, comprising:

determination means for determining whether a given request from a client is directed to data supplied by the server or directed to data uniquely supplied by said data processing apparatus; and control means for, when said determination means determines that the given request is directed to data provided by the server, transferring the given request to the server, while, when said determination means determines that the given request is directed to uniquely supplied data, performing processing in accordance with the given request and sending a processed result to the client, wherein said determination means performs the determination by comparing the given request with requests stored in a storage device, the stored requests being related to uniquely supplied data, wherein in a case where said determination means determines that the given request is directed to uniquely supplied data, said control means transfers contents of the given request to a processing module which executes a service of the uniquely supplied data, and wherein the uniquely supplied data includes a service for controlling a camera which can be controlled, and a service for acquiring an image picked up by the camera.

2. The data processing apparatus according to claim 1, wherein the generally used protocol is Hyper Text Transfer Protocol (HTTP).

3. A system constructed by having a plurality of data processing apparatuses according to claim 1 which are linked to each other.

4. A method of controlling a data processing apparatus which supplies a client in a network with data other than data provided by a server, in conformity with a generally used protocol, comprising the steps of:

determining whether a given request from a client is directed to data supplied by the server or directed to data uniquely supplied by the data processing apparatus; and performing a control step for, when it is determined in said determining step that the given request is directed to data provided by the server, transferring the given request to the server, while, when it is determined in said determining step that the given request is directed to uniquely supplied data, performing processing in accordance with the given request and sending a processed result to the client, wherein the determination said determining step is obtained by comparing the given request with requests stored in a storage device, the stored requests being related to uniquely supplied data, wherein in a case where said determination means determines that the given request is directed to uniquely supplied data, said control means transfers contents of the given request to a processing module which executes a service of the uniquely supplied data, and wherein the uniquely supplied data includes a service for controlling a camera which can be controlled, and a service for acquiring an image picked up by the camera.

5. A method of controlling the data processing apparatus according to claim 2, further comprising a process step executed in response to a request directed to the uniquely supplied data, as an independent step.

6. A storage medium storing a program serving as a data processing apparatus which supplies a client in a network with data other than data provided by a server in conformity with a generally used protocol, by causing a computer to read and execute the program, the program comprising:

program codes serving as determination means for determining whether a given request from a client is directed to data supplied by the server or directed to data uniquely supplied by the data processing apparatus; and program codes serving as control means for, when the determination means determines that the given request is directed to data provided by the server, transferring the given request to the server, while, when the determination means determines that the given request is directed to uniquely supplied data, performing processing in accordance with the given request and sending a processed result to the client, wherein the determination means performs the determination by comparing the given request with requests stored in a storage device, the stored requests being related to uniquely supplied data, wherein in a case where said determination means determines that the given request is directed to uniquely supplied data, said control means transfers contents of the given request to a processing module which executes a service of the uniquely supplied data, and wherein the uniquely supplied data includes a service for controlling a camera which can be controlled, and a service for acquiring an image picked up by the camera.

7. A data processing apparatus for supplying a client in a network with data other than data provided by a server, in conformity with Hyper Text Transfer Protocol (HTTP), comprising:

storage means for storing identification data for identifying whether a given request is directed to data supplied by the server or directed to uniquely supplied data;

determining means for determining whether or not a request transmitted by a client is directed to uniquely supplied data, by referring to the identification data stored in said storage means;

control means for performing processing corresponding to the request when said determining means determines that the request is directed to uniquely supplied data; and transferring means for transferring the request to the server when said determining means determines that the request is directed to data supplied by the server, wherein the uniquely supplied data includes a service for controlling a camera which can be controlled, and a service for acquiring an image picked up by the camera.

8. The data processing apparatus according to claim 7, wherein said control means transfers contents of the client request to a processing module which executes a service of the uniquely supplied data.

9. A system constructed by having a plurality of data processing apparatuses according to claim 7 which are linked to each other.

10. The data processing apparatus according to claim 7, wherein said server is a World Wide Web (WWW) server in the Internet.

11. A method of controlling a data processing apparatus which supplies a client in a network with data other than data provided by a server, in conformity with Hyper Text Transfer Protocol (HTTP), comprising the steps of:

determining whether or not a request transmitted by a client is directed to uniquely supplied data, by referring to identification data stored in advance;

controlling to perform processing corresponding to the request when it is determined that the request is directed to uniquely supplied data; and transferring the request to the server when it is determined that the request is directed to data supplied by the server, wherein the uniquely supplied data includes a service for controlling a camera which can be controlled, and a service for acquiring an image picked up by the camera.

12. A method of controlling the data processing apparatus according to claim 11, wherein processing performed in a controlling step in response to the given request is an independent step.

13. A method of controlling the data processing apparatus according to claim 11, wherein said server is a World Wide Web (WWW) server in the Internet.

14. A storage medium, storing a program, serving as a data processing apparatus which supplies a client in a network with data other than data provided by a server in conformity with Hyper Text Transfer Protocol (HTTP) by causing a computer to read and execute the program, comprising:

program codes serving as determining means for determining whether or not a request transmitted by a client is directed to uniquely supplied data, by referring to identification data stored in advance;

program codes serving as control means for executing processing means corresponding to the request when said determining means determines that the request is directed to uniquely supplied data; and program codes serving as transferring means for transferring the request to the server when said determining means determines that the request is directed to data supplied by the server, wherein the uniquely supplied data includes a service for controlling a camera which can be controlled, and a service for acquiring an image picked up by the camera.

15. The storage medium according to claim 14, wherein program codes for providing a service in response to the request directed to the uniquely supplied data are independent from each of said program codes for the determining means, control means, and transferring means.

16. The storage medium according to claim 14, wherein said server is a World Wide Web (WWW) server in the Internet.

* * * * *

UNITED STATES PATENT AND TRADEMARK OFFICE
CERTIFICATE OF CORRECTION

PATENT NO. : 6,578,067 B1
DATED : June 10, 2003
INVENTOR(S) : Okazaki et al.

It is certified that error appears in the above-identified patent and that said Letters Patent is hereby corrected as shown below:

<u>Title page,</u>
Item [57], ABSTRACT,
Line 3, "Response" should read -- In response --;
Line 6, "it provides" should read -- providing --; and
Line 8, "Wall, the" should read -- Wall and the --.

<u>Column 7,</u>
Line 12, "claim 1" should read -- claim 1, --.

<u>Column 8,</u>
Line 37, "claim 7" should read -- claim 7, --.

Signed and Sealed this

Twenty-fifth Day of November, 2003

JAMES E. ROGAN
*Director of the United States Patent and Trademark Office*